US012227061B2

(12) United States Patent
Erichsen et al.

(10) Patent No.: US 12,227,061 B2
(45) Date of Patent: *Feb. 18, 2025

(54) WATERTIGHT STRUCTURES AND METHODS OF MAKING THE SAME

(71) Applicant: H.B. Fuller Company, St. Paul, MN (US)

(72) Inventors: Craig A. Erichsen, Granger, IN (US); Jonathon O. Cordell, South Bend, IN (US)

(73) Assignee: H.B. Fuller Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,777

(22) Filed: Jun. 30, 2023

(65) Prior Publication Data

US 2024/0116341 A1 Apr. 11, 2024

Related U.S. Application Data

(63) Continuation of application No. 18/045,017, filed on Oct. 7, 2022, now Pat. No. 11,820,209.

(51) Int. Cl.
| | |
|---|---|
| *B60J 10/35* | (2016.01) |
| *B60J 1/00* | (2006.01) |
| *B60J 10/15* | (2016.01) |
| *B62D 63/06* | (2006.01) |

(52) U.S. Cl.
CPC .............. *B60J 10/35* (2016.02); *B60J 1/006* (2013.01); *B60J 10/15* (2016.02); *B62D 63/06* (2013.01)

(58) Field of Classification Search
CPC ... B60J 1/006; B60J 10/15; B60J 10/34; B60J 10/35; B60P 3/32; B60P 3/34; B62D 25/02; B62D 33/046; B62D 63/06
USPC .................................................. 296/156, 168
See application file for complete search history.

(56) References Cited

U.S. PATENT DOCUMENTS

| | | | |
|---|---|---|---|
| 6,450,564 B1 * | 9/2002 | Sill ...................... | B62D 33/046 52/584.1 |
| 7,147,268 B2 * | 12/2006 | Winter ...................... | B60P 3/34 296/156 |
| 10,239,566 B2 * | 3/2019 | Bauer .................. | B62D 29/005 |
| 11,292,320 B1 * | 4/2022 | Rice ......................... | B60J 1/006 |
| 11,400,852 B2 * | 8/2022 | Connolly ............... | B62D 25/06 |
| 2012/0055841 A1 * | 3/2012 | Flener ...................... | B60J 10/34 206/586 |
| 2012/0306236 A1 * | 12/2012 | Skipper ................ | B62D 33/046 296/193.04 |
| 2020/0139663 A1 * | 5/2020 | Sweet ..................... | B32B 15/18 |

* cited by examiner

*Primary Examiner* — Jason S Daniels
(74) *Attorney, Agent, or Firm* — Kristi Halloran

(57) ABSTRACT

This invention is directed to a structure and a method of sealing the structure as it is manufactured. The method uses a combination of thermoplastic sealants in the form of films and a substrate encapsulated tape.

20 Claims, 2 Drawing Sheets

WATERTIGHT STRUCTURES AND METHODS OF MAKING THE SAME

This application is a Continuation and claims the benefit of Priority of U.S. patent application Ser. No. 18/045,017 filed Oct. 7, 2022, which is incorporated herein.

BACKGROUND

Recreational vehicles and other types of structures (e.g., utility vehicles, trailers, buses, walk-in vans, box trucks, rail cars, ambulances, boats, sheds, etc.) are exposed to high speeds and various forces as they are used to transport people and goods. Such structures can further be exposed to a variety of weather conditions during their normal use e.g., extreme temperatures, snow and rain. It is critical that the exterior of the structure be watertight to prevent water from getting into the structure and causing damage to it. It is further critical that the materials used to create the watertight structure are durable enough to maintain performance as the structure is used.

To ensure that the exterior of a structure is watertight, sealant is needed not only on the roof to wall joints but also along wall to wall joints, around corners, around the flange of inserted items (e.g., windows, doors, etc.), around access points to various functionality e.g., water hook ups, electricity hook ups, etc. and in any other place where gaps are formed during construction.

For decades room temperature applied liquid sealants (e.g., silicone, solvent based, etc.) generally in the form of a bead have been used to seal the various areas of a movable structure. Liquid sealants are used to seal seams and around cut outs on the side and the top of the structure. The liquid sealant is often located on the outside of the structure and once cured is visible after manufacture. Further, since it is on the outside of the structure, it is exposed to a variety of weather conditions.

Room temperature applied liquid sealants can be difficult to handle and when trim pieces are pushed in place over the top of the sealant it often results in squeeze-out that must be cleaned-up by hand. Further, when liquid sealants are used to seal around the outside of items such as vents, trim, windows, etc. they are messy and don't always seal the structure completely. Finally, since the sealants are primarily present on the outside of the structure and are exposed to a variety of weather conditions, they age and crack over time and must be patched and/or removed and reapplied every year or two to maintain performance.

It would be useful if alternate sealants were available that could improve the ease of sealing the exterior of a movable structure, are not exposed directly to the environment and further do not have to be patched and/or removed and reapplied periodically.

SUMMARY

In one aspect, the invention features a structure selected from the group consisting of recreational vehicle, utility vehicle, trailer, bus, walk-in van, box truck, rail car, ambulance, boat, and shed including a. a single-sided thermoplastic film tape, b. a multi-sided thermoplastic tape, and c. a substrate-encapsulated tape comprising a substrate core encapsulated with a thermoplastic sealant, wherein a., b., and c., make up the majority of the sealant used to seal the exterior of the structure.

In one embodiment, a., b., and c., make up at least 75% by weight of the sealant used to seal the exterior of the structure. In another embodiment, a., b., and c., make up 100% by weight of the sealant used to seal the exterior of the structure. In a different embodiment, exterior of the structure is free of sealants applied as a room temperature liquid. In another embodiment, the exterior of the structure is free of reactive sealants. In one embodiment, the exterior of the structure is free of silicone sealants applied as a room temperature liquid. In another embodiment, the exterior of the structure is free of sealants applied as a room temperature liquid and reactive sealants.

In one embodiment, the structure is airtight as tested by the Sealtech test. In a different embodiment, the single-sided thermoplastic film tape includes a backing having a first and second side, and a thermoplastic sealant applied in a film to one of the first and the second sides. In another embodiment, the single-sided thermoplastic film tape has a thickness of from 10 mil to 75 mil and a width of from 1 inch to 10 inches. In one embodiment, the single-sided thermoplastic film tape and the multi-sided thermoplastic tape pass the Penetration Seal Test. In a different embodiment, the multi-sided thermoplastic tape is selected from the group consisting of double-sided thermoplastic film tape, butyl tape and combinations thereof. In another embodiment, the single sided thermoplastic tape and the multi sided thermoplastic tape comprise a thermoplastic sealant comprising a thermoplastic polymer selected from the group consisting of butyl rubber, styrene block copolymer, EPDM rubber and combinations thereof. In one embodiment, the single sided thermoplastic film tape and the multi sided thermoplastic tape comprise a thermoplastic sealant including thermoplastic polymer selected from the group consisting of butyl rubber, styrene block copolymer, EPDM rubber and combinations thereof, and from 15% by weight to 60% weight of one or more fillers.

In another embodiment, the substrate encapsulated tape comprises a foam substrate and is encapsulated by a sealant comprising a polymer selected from the group consisting of butyl rubber, styrene block copolymer, EPDM rubber and combinations thereof. In a different embodiment, the substrate-encapsulated tape comprises a foam substrate encapsulated by a sealant comprising a butyl rubber and no greater than 60% by weight filler. In one embodiment, the substrate-encapsulated tape passes the "U" channel penetration test method.

The structure can be selected from the group consisting of recreational vehicle and trailer.

In another aspect, the invention features a structure selected from the group consisting of recreational vehicle, utility vehicle, trailer, bus, walk-in van, box truck, rail car, ambulance, boat, and shed including a. a single-sided thermoplastic film tape comprises a backing having a first and second side, and a thermoplastic sealant applied in a film to one of the first and the second sides, b. a multi-sided thermoplastic tape comprising a double-sided thermoplastic film tape, and c. a substrate encapsulated tape comprising a foam substrate encapsulated by a sealant comprising no greater than 60% by weight filler, wherein a., b., and c., make up the majority of the sealant used to seal the exterior of the structure.

In a different aspect, the invention features a method of sealing a structure, the method including positioning a single-sided thermoplastic film tape such that it overlaps a roof to wall joint, positioning a multi-sided thermoplastic tape to seal and adhere one or more items selected from the group consisting of front cap, end cap, electrical outlet plate, vent, skylight, non-flanged items, and combinations thereof to the exterior of the structure, and positioning a substrate encapsulated tape on the exterior structure facing side of a flange of a component inserted into a cut out, the component selected from the group consisting of a window and a door, wherein the structure is selected from the group consisting of a recreational vehicle and a trailer.

Applicants have discovered a sealed structure and a method of sealing the exterior of the structure as it is manufactured. The method uses a combination of thermoplastic sealant tape and substrate encapsulated tape. The system can be a "dry" system in that prior art room temperature liquid sealants are not needed.

Definitions

Movable as used herein refers to structures that are portable. As used in this context a house or other large building is not considered movable.

DETAILED DESCRIPTION

The invention includes a structure selected from the group consisting of a recreational vehicle, utility vehicle, trailer, bus, walk-in van, box truck, rail car, ambulance boat, and shed and a method of sealing its exterior. The structure is movable. The structure of this invention does not include an automobile or an airplane.

The structure is selected from the group consisting of recreational vehicle, utility vehicle, trailer, bus, walk-in van, box truck, rail car, ambulance, boat, and shed; including a single-sided thermoplastic film tape (SSTFT), a multi-sided thermoplastic tape (MSTT) and a substrate encapsulated tape (SET) including a substrate core encapsulated with a thermoplastic sealant.

The exterior of the structure is sealed primarily with the SSTFT, the MSTT and the SET. The SSTFT, MSTT and the SET can make up greater than 50% by weight (i.e., the majority of), greater than 60% by weight, greater than 70% by weight, greater than 80% by weight, greater than 90% by weight, from 60% by weight to 100% by weight, from 80% by weight to 100% by weight, or even 100% by weight of the sealant used to seal the exterior of the structure.

Figure 3:
FIG. 3 is a photo of a recreational vehicle travel trailer with single-sided thermoplastic film tape in place to seal a wall to wall joint (20).
Figure 4:
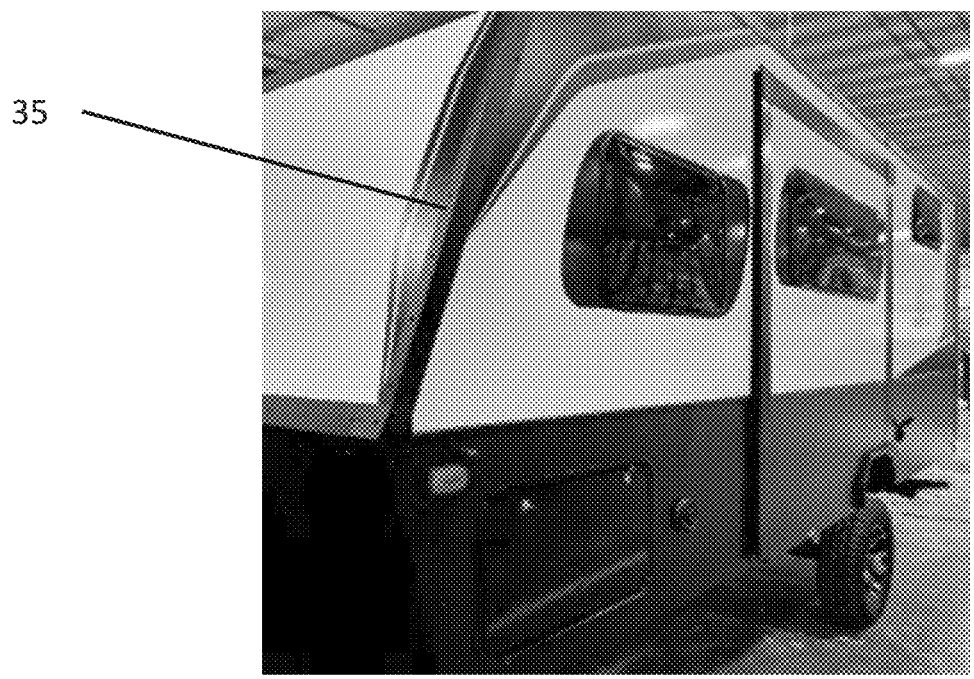
FIG. 4 is a photo of a recreational vehicle travel trailer with the trim (35) in place over the top of the single-sided film tape.

The exterior of the movable structure can be free of sealants that are applied as room temperature liquids including e.g., silicone sealants, solvent based sealants, etc. FIG. 3 shows the roof of a prior art movable structure with a sealant applied as a room temperature liquid in place (7,14). FIG. 4 shows the roof of the inventive structure with SSTFT (17) and MSTT (located beneath the SSTFT, 17) in place. The inventive thermoplastic film sealants maintain closer contact to the roof to provide a tighter seal, are easier to work with and result in a neat appearance.

The exterior of the structure can further be free of reactive sealants. This is desirable as reactive sealants need to be supplied in closed containers, or in two parts, have a limited shelf life and often need special equipment for application. The structure can be airtight as tested by the Sealtech test.

Structure

The structure of this invention is movable. The structure can be selected from the group consisting of a recreational vehicles (e.g., motorhomes, camper vans, coaches, travel trailers, camper trailers, camper vans, fifth-wheel trailers, pop-up trailer, truck campers, etc.), utility vehicles, other trailers (animal trailer (e.g., for transporting animals e.g., horse trailer), freight trailer, moving trailer, concession trailer, semi-trailer, or any other kind of trailer), bus, walk-in van, box truck, rail car, ambulance, boat, and shed. The structure of this invention does not include an automobile or an airplane.

As the structure is constructed, and the separate parts (e.g., frame, walls, roofing materials, windows, doors, water hook-up, electrical etc.) are combined and installed, small gaps between the interior and the exterior of the movable structure are formed. For example, there is a small gap along the outer perimeter of the roof where the framed walls are connected to the roof. There is also a small gap between the flange (the flange extends outward around the exterior perimeter of a window or door and provides a surface to enable the attachment of the window or door to the exterior of the structure) of a window, or a door and the space cut into the exterior of the movable structure (i.e., cut-out) in which the window/door flange combination is inserted. There can also be small gaps in other portions of the movable structure e.g., where small cut outs are formed to insert water hook-ups, electrical outlet plates, vents, skylights, and other non-flanged items. To prevent water from getting within the interior of the movable structure, the gaps on the exterior of the movable structure need to be sealed.

The exterior of the structure can be manufactured from a variety of materials.

These materials can include ethylene propylene diene monomer (EPDM) rubber, synthetic rubber (e.g., HYPALON), plastics (e.g., thermoplastic olefins (TPO), acrylonitrile butadiene styrene (ABS), poly vinyl chloride (PVC), polyester, etc.) metal (e.g., aluminum, galvanized steel, etc.), wood/wood composites (e.g., gypsum board) and fiberglass. Since the materials used in the manufacture of the structure can vary, the sealants need to be able to adhere to a wide variety of materials.

Thermoplastic Sealant

The SSTFT, the MSTT and the FGT all include a room temperature solid thermoplastic sealant.

The sealant is a thermoplastic sealant i.e., there is no chemical cure after the sealant is applied. The inventors believe this is critical to the performance of the sealant as it gives the sealant the ability to consistently penetrate the surfaces that are being sealed. As applied, the thermoplastic sealant is a solid at room temperature, this is also helpful as it prevents squeeze-out when various parts of the movable structure are brought together. Thermoplastic sealants are also advantageous as unlike reactive sealants, they do not need to be supplied in closed containers, or in two parts, have a longer shelf life and do not need special equipment for application.

The primary function of the thermoplastic sealant is to seal the movable structure from the outdoors and to prevent moisture from getting into the structure. However, the sealant can also have adhesive properties.

The sealant includes one or more thermoplastic polymers. The thermoplastic polymer can be selected from the group consisting of styrenic block copolymers, styrene butadiene rubber, butyl rubber (e.g., isobutylene-isoprene copolymers), polyisobutylene, ethylene propylene copolymers, EPDM rubber, olefin polymers e.g., amorphous poly alpha olefins, single-site catalyzed polyolefins (e.g., propylene or ethylene based homopolymers and copolymers), cyclic olefins, olefin block copolymers etc., ethylene alkyl acetates (e.g., ethylene vinyl acetate), ethylene alkyl acrylates (e.g., ethylene n-butyl acrylate, ethylene methacrylate, ethylene methyl-methacrylate), polyester polyether copolymers and modified versions thereof.

The thermoplastic polymer can be selected from the group consisting of styrenic block copolymer, butyl rubber, EPDM rubber and combinations thereof.

The sealant can include one or more fillers. A filler is a particulate or fiber that can be added to a material to improve specific properties or to make it cheaper. Fillers include mineral fillers e.g., ground calcium carbonate, precipitated calcium carbonate (PCC), kaolin i.e., clay, talc, silica, precipitated silica, alumina silicates, wollastonite, mica, zeolites, ceramics, titanium dioxide, carbon black, etc., glass fibers, plastic fibers, nanoparticles, etc.

In the sealants of this invention the amount of filler is limited to allow for more materials that contribute to improve adhesion. The sealant can include no greater than 70% by weight, no greater than 65% by weight, no greater than 60% by weight, no greater than 55% by weight, no greater than 50% by weight, from 10% by weight to 70% by weight, from 12% by weight to 65% by weight, from 15% by weight to 60% weight, from 15% by weight to 55% by weight, from 15% by weight to 50% by weight, or even from 15% by weight to 30% by weight of filler.

The thermoplastic sealant can include one of more tackifying agents. Suitable tackifying agents can be liquid or solid at room temperature. Suitable tackifying agents include hydrocarbon resins, (e.g. aliphatic, cycloaliphatic, and aromatic modified versions thereof), terpene resins, modified terpene resins, (e.g., phenolic modified terpene resins), alpha methyl styrene resins, natural and modified rosin based resins (e.g., gum rosin, wood rosin, tall oil rosin, dimerized rosin, polymerized rosin, and rosin esters), alpha methyl styrene resins and other end block associating resins, and hydrogenated versions thereof.

The thermoplastic sealant can include one or more plasticizers. Suitable plasticizers include paraffinic oils, naphthenic oils, and low molecular weight polymeric plasticizers (e.g., polybutene-1 and low molecular weight polyisobutene).

The thermoplastic sealant can include a variety of other materials including waxes and various additives (e.g., antioxidants, UV-light stabilizers, and absorbers, etc.).

Single-Sided Thermoplastic Film Tape

The single-sided thermoplastic film tape (SSTFT) includes a backing having a first and second side, and a thermoplastic sealant applied in a film to one of the first and the second sides. The SSTFT can further include a release liner layered over the top of the sealant to enable the tape to be wound up upon itself prior to use.

Figure 1:
FIG. 1 is a photo of the roof of a prior art recreational vehicle with liquid sealant applied along the roof line (7) and around a sky light (14).
Figure 2:
FIG. 2 is a photo of the roof of the inventive recreational vehicle utilizing thermoplastic film tapes (17).

The SSTFT can be used for sealing gaps, especially around corners, roof to wall joints, and wall to wall joints. Many liquid sealants are applied in a bead form. However, the SSTFT is flat and relatively thin. This is advantageous when used in sealing a movable structure as the SSTFT can be easily applied beneath trim pieces and still result in a flat profile. See FIG. 1 and FIG. 2. In FIG. 1, 20 you can see the SSTFT where it seals a wall to wall joint. In FIG. 2, 35 you can see how well the SSTFT is covered by the trim.

The SSTFT can be no greater than 75 mil thick, no greater than 50 mil thick, from 10 mil thick to 75 mil thick, or even from 15 mils thick to 50 mil thick.

The SSTFT can have a width of from ½ inch to 60 inches, 1 inch to 48 inches, 1 inch to 20 inches, 1 inch to 10 inches, or even 1 inch to 8 inches. It can be rolled up into a roll having a length of from 10 feet to 200 feet, 10 feet to 100 feet, or even from 25 feet to 75 feet.

The backing material can be selected from any number of suitable materials. The backing materials can be selected from the group consisting of polymeric materials (e.g., thermoplastic olefin, polyester (e.g., mylar), etc.), metal foils (e.g., aluminum foil, copper foil) and fabric (e.g., roofing cloth).

Suitable SSTPT's include those available under the ETERNABOND trade name from H.B. Fuller Company including ETERNABOND RVSEAL and ETERNABOND ROOFSEAL.

Multi-Sided Thermoplastic Tape

The invention includes a multi-sided thermoplastic tape. The multi-sided thermoplastic tape can be in a form selected from a film, a rope and a thick layer.

In the multi-sided tape, more than one side is available for sealing. When, the multi-sided tape is in the form of a rope, all sides are available for sealing. The multi-sided thermoplastic tape consists entirely of a thermoplastic sealant, i.e., it does not include a backer or an encapsulated substrate. After manufacture and extrusion into the desired form, a release liner can be applied to enable the tape to be wound up upon itself prior to use.

When in the form of a film, the tape can be called a double-sided thermoplastic film tape (DSTFT), when in the form of a rope or a relatively thicker layer and comprising butyl rubber, the tape is often known in the industry as a butyl tape.

Double-Sided Thermoplastic Film Tape

The multi-sided thermoplastic tape can be in the form of a double-sided thermoplastic film tape including a film of thermoplastic sealant including a front side and a back side. Both the front side and the back side of the DSTFT are available for sealing. The DSTFT consists entirely of a film of thermoplastic sealant including a front side and a back side. After manufacture, a release liner can be applied to both the front side and the back side to enable the tape to be wound up upon itself prior to use.

The DSTFT can be applied as a tape i.e., the release liner can be removed slowly as the first side of the tape is pushed into place on the first substrate. The release liner can then be removed from the second side and a second substrate can be pushed into place.

The DSTFT is especially useful in sealing around small cut outs such as those formed when water hook-up, electrical hook-up, vents, skylights, other non-flanged parts, etc. are inserted into the structure. The DSTFT can also be useful to attach pieces of trim in need of additional sealing. The DSTFT can seal and adhere the part to the wall and then the part can be screwed in place for permanent attachment using mechanical fasteners such as e.g., screws. The DSTFT maintains a seal even when a screw passes through it. The DSTFT can pass the Penetration Seal Test.

The DSTFT is flat and relatively thin. The DSTFT can be no greater than 75 mil thick, no greater than 50 mil thick, from 10 mil thick to 75 mil thick, or even from 15 mils thick to 70 mil thick.

The DSTFT can have a width of from ½ inch to 60 inches, 1 inch to 48 inches, 1 inch to 20 inches, 1 inch to 10 inches, or even 1 inch to 8 inches. It can be rolled up into a roll having a length of from 10 feet to 100 feet, or even from 25 feet to 75 feet.

Suitable DSTPT's include those available under the ETERNABOND trade name from H.B. Fuller Company including ETERNABOND DOUBLESTICK.

Butyl Tape

The multi-sided thermoplastic tape can be in the form of a butyl-tape.

Butyl tape includes a room temperature solid thermoplastic sealant including butyl rubber that is supplied in a roll. The butyl tape can be used in a similar manner as the DSTFT.

Butyl tape can be in the form of a rope, the rope can have a diameter of from 0.118 inches to 1.18 inches, from 0.197 inches to 0.984 inches, or even from 0.276 inches to 0.984. Alternatively, in the form of a flat rectangular shaped tape, the tape can have a thickness of from 39 mil to 393 mil, or even from 78.7 mil to 276 mil and a width of from 0.118 inches to 1.18 inches, from 0.197 inches to 0.984 inches, or even from 0.276 inches to 0.984. Either way, it is typically extruded and wound into a roll for use later. The roll can have a length of from 10 feet to 400 feet, from 10 feet to 200 feet, or even from 25 feet to 150 feet.

Suitable butyl tapes include those available under the ADCOSEAL trade name from H.B. Fuller Company including ADCOSEAL BX-033 and ADCOBOND D-18-221, both butyl based pressure sensitive tapes.

Substrate Encapsulated Tape

The substrate encapsulated tape includes a substrate encapsulated by a thermoplastic sealant. By encapsulated it is meant that the sealant surrounds the substrate on at least two sides or even on all sides. Having the substrate within the sealant provides a "positive stop" in other words it allows the substrate encapsulated tape to be compressed between the materials that are being sealed, while maintaining a set distance between the materials which helps to prevent the sealant from being entirely squeezed-out. Having the sealant surrounding the substrate improves over all adhesion between the materials being sealed.

The substrate encapsulated tape can be in the form of a film, including two films of thermoplastic sealant, layered on each of the front side and the back side of a backing material.

The substrate encapsulated tape can be in the form of a rope, flat rectangular shaped tape, or any other form. In this form the substrate is encapsulated on all sides by the thermoplastic sealant. If in the form of a rope, the rope can have a diameter of from 0.118 inches to 1.18 inches, from 0.197 inches to 0.984 inches, or even from 0.276 inches to 0.984. Alternatively, in the form of a flat rectangular shaped tape, the tape can have a thickness of from 39 mil to 393 mm, or even from 78.7 mil to 276 mil and a width of from 0.118 inches to 1.18 inches, from 0.197 inches to 0.984 inches, or even from 0.276 inches to 0.984. Either way, it is typically extruded and wound into a roll for use later. The roll can have a length of from 10 ft to 200 ft, from 10 feet to 100 feet, or even from 25 feet to 75 feet.

The substrate can be selected from any appropriate material including non-foamed materials and foamed materials. The substrate can include poly vinyl chloride (PVC), thermoplastic olefins (e.g., polyethylene, polypropylene, etc.), polyesters (e.g. polyethylene terephthalate (PET)), polyurethane, etc.

The substrate encapsulated tape can be a foam gasket tape (FGT). The foam gasket tape includes a foam core that is encapsulated by a thermoplastic sealant.

The substrate encapsulated tape is especially useful for sealing around any item added to the side of a movable structure that needs to be able to change position e.g., window, door, etc. The substrate encapsulated tape can be applied to the exterior facing side of the flange supporting the item to be added and then as the flange is pushed into place and secured, the substrate encapsulated tape provides a sealant around the cut out region and can help support the item until it is mechanically fixed into place.

When the substrate encapsulated tape is an FGT, it can include a foamed PVC core encapsulated in a sealant comprising butyl rubber.

Suitable substrate encapsulated tapes include those available under the ETERNABOND trade name from H.B. Fuller Company including ETERNABOND FGT BC-1241. ETERNABOND FGT BC-1241 has a PVC foam core encapsulated with a high performing, high tack butyl sealant.

Method of Sealing a Structure

The invention features a method of sealing the exterior of a structure. The structure is sealed during manufacturing. By "during manufacturing" it is meant that the structure is sealed as it is assembled.

By utilizing the SSTFT, the MSTT, the SET, the exterior of a movable structure can be sealed in a simplified manner without the need of sealants applied as room temperature liquids. Further, the method results in a movable structure that can maintain its seals for an extended period without the need for patching or removing and reapplying additional sealant.

The SSTFT, MSTT, the SET can be used together to seal the exterior of a movable structure in any possible manner. The SSTFT, MSTT and SET can be used individually or together. Once the SSTFT, the MSTT and the SET are in place, pressure can be applied either by hand in the form of a weighted roller to ensure proper contact with the substrate/s to be sealed.

The invention features a method of sealing a movable structure during manufacture including positioning a single-sided thermoplastic film tape such that it overlaps the roof to wall joints, positioning a multi-sided thermoplastic tape to seal a material selected from the group consisting of front cap, end cap, electrical outlet plate, vent, skylight, non-flanged item, and combinations thereof to the exterior of a movable structure and positioning a substrate encapsulated tape on the exterior structure facing side of a flange of a component inserted into a cut out, the component selected from the group consisting of a window and a door.

To seal around an item inserted into the roof of a movable structure e.g., skylight, vent, air-conditioning unit, etc., the SSTFT can be applied to overlap the area where the perimeter of the item meets the roof. Alternatively, the MSTT can be applied between the roof and inner perimeter of the item, the item can then be screwed into place through the MSTT. When an even higher level of sealing is desired, the SSTFT and the MSTT can be used together. The MSTT can be applied between the roof and the perimeter of the item, the item screwed into place through the MSTT, and finally the SSTFT applied to overlap the area where the item meets the roof around its outer edges. In any of the scenarios described above, it is an advantage that the sealant is not exposed directly to the environment but rather either beneath the item or the backing of the SSTFT.

Similar approaches can also be taken with the seam around the perimeter of a roof or where portions of the exterior walls come together. At times, trim can be in place to cover the SSTFT.

The SET can be useful to seal around a flanged item such as e.g., water heater vents, window, door (e.g., entrance door, baggage door, access door, etc.), etc. The SET can be pushed in place on the flange, facing the exterior of the movable structure, then as the flanged item is secured into place against the exterior of the movable structure, the SET is compressed and provides sealing in the area. The SET can also be useful to seal the front cap of a movable vehicle such as e.g., a recreational vehicle. The front cap is a hollow piece of trim that is installed over the front end of a recreational vehicle. The SET can be inserted into a channel in the front cap and as it is pushed into place and mechanically attached the SET compresses and provides sealing properties.

EXAMPLES

Test Procedures

Test procedures used in the examples include the following. The procedures are conducted at room temperature (i.e., an ambient temperature of from about 20° C. to about 25° C.) unless otherwise specified.

Penetration Seal Test

In the penetration seal test, the ability of a single-sided or multi-sided tape's ability to maintain a watertight seal after a screw (round head screw, 1.25 inch in length with a head width of 0.408 inches) has been screwed through it is tested.

A piece of film tape (3 inch by 3 inch) is applied to one side of a 4 inch by 12 inch aluminum panel having 6 screw holes, the screw holes are placed at least 0.25 inches from the edges of the tape and placed so that there are 2 in each 3 inch by 3 inch section. The tape is applied so that it completely covers 2 screw holes. Screws are then inserted into the screw holes so that that they pass through the film tape. Sealant is applied around the outer edge of the film tape on the panel to form a wall of about one inch high, enclosing the film tape. Three films of the product to be tested are evaluated at the same time, side by side along the length of the panel. The panel is then placed on a piece of white paper towel and the enclosure formed by the sealant is filled with water. The water is colored/dyed slightly for easier determination of leaks. The panel is left in place for 48 hours. After which, the paper is evaluated to determine if there is any sign of water leakage through the screw in the panel or any sign of the color/dye from the water. If there is no leakage in any of the samples, the thermoplastic film tape passes the Penetration Seal Test.

"U" Channel Leak Test

In the "U" Channel Leak Test the seal ability against water penetration or leakage of the substrate encapsulated tape is tested.

About 10 inches of the substrate encapsulated tape was formed into a "U" shape (having a height of at least 3.15 inches, where the ends are 1.57 inches apart) and compressed between a piece of glass (4 inches by 4 inches) and a piece of painted metal (4 inches by 6 inches) and then pressed to a target gap size of 0.157 inches (4 mm). Water was then added to fill the space within the "U" shape to a height of at least 3.15 inches and left at ambient temperature for 24 hours. Any samples that successfully held water at ambient temperature, were then place at 80° C. for 2 hours to check the performance at an elevated temperature. Two samples of each substrate encapsulated tape were tested. The samples were visually evaluated for leaks. If no leaks formed at RT or at 80° C. for both samples, the substrate encapsulated tape was rated as passing.

Sealtech Leak Test

In the Sealtech Leak Test the air tightness of a recreational vehicle is tested in the following way. All windows and doors are closed completely. A device is then attached to an entry door insert or open roof vent. The device pumps air into the structure, causing it to be pressurized. An individual with a pressurized spray vessel filled with soapy water (dish soap diluted with water) walks around and sprays the soapy water on all seams looking for bubbles. Bubbles indicate the presence of an air leak i.e., air escaping the pressurized vehicle, which will result in a water leak when in use. If no leaks are found the movable structure passes the Sealtech test.

TABLE 1

|  | Penetration Seal Test | "U" Channel Leak Test |
| --- | --- | --- |
| ETERNABOND RVSEAL | Pass | Not tested |
| ETERNABOND DOUBLESTICK | Pass | Not tested |
| ETERNABOND FGT BC-1241 | Not tested | Pass |

Example 1: The exterior of a Keystone BULLET recreational vehicle travel trailer available from Keystone RV Company was sealed using the following sealants: ETERNABOND RVSEAL, ETERNABOND DOUBLESTICK and ETERNABOND FGT BC-1241.

No room temperature liquid applied sealant was used. The recreational vehicle was tested and found to pass the Sealtech Leak Test.

Example 2: The exterior of an Ember OVERLAND recreational vehicle travel trailer available from Ember Recreational Vehicles was sealed using the following sealants: ETERNABOND RVSEAL, ETERNABOND DOUBLESTICK and ETERNABOND FGT BC-1241. No room temperature liquid applied sealant was used. The recreational vehicle was tested and found to pass the Sealtech Leak Test.

Other embodiments are within the claims. The documents referred to herein are incorporated to the extent they do not conflict.

What is claimed is:

1. A structure selected from the group consisting of recreational vehicle, utility vehicle, trailer, bus, walk-in van, box truck, rail car, ambulance, boat, and shed comprising:
    a. a single-sided thermoplastic film tape,
    b. a multi-sided thermoplastic tape, and
    c. a substrate-encapsulated tape comprising a substrate core encapsulated with a thermoplastic sealant, wherein a., b., and c., are disposed on the exterior of the structure and make up greater than 50% by weight of the sealant on the exterior of the structure, and
    wherein the single sided thermoplastic film tape and the multi sided thermoplastic tape comprise a thermoplastic sealant comprising:
        i. one or more thermoplastic polymers selected from the group consisting of styrenic block copolymers, styrene butadiene rubber, butyl rubber, polyisobutylene, ethylene propylene copolymers, EPDM rubber, olefin polymers, ethylene alkyl acetates, ethylene alkyl acrylates, polyester polyether copolymers and modified versions thereof, and
        ii. from 10% by weight to 70% by weight of one or more fillers.

2. The structure of claim 1, wherein the thermoplastic sealant comprises a polymer selected from the group consisting of butyl rubber, styrene block copolymer, EPDM rubber and combinations thereof.

3. The structure of claim 1 wherein the thermoplastic sealant comprises a styrene block copolymer.

4. The structure of claim 1 wherein the thermoplastic sealant comprises one or more fillers selected from the group consisting of ground calcium carbonate, precipitated calcium carbonate, kaolin, talc, silica, precipitated silica, alumina silicates, wollastonite, mica, zeolites, ceramics, titanium dioxide, carbon black, glass fibers, plastic fibers and nanoparticles.

5. The structure of claim 1 wherein the thermoplastic sealant comprises from 15% by weight to 60% by weight of one or more fillers.

6. The structure of claim 1 wherein the thermoplastic sealant comprises:
   a. thermoplastic polymer selected from the group consisting of butyl rubber, styrene block copolymer, EPDM rubber and combinations thereof, and
   b. from 15% by weight to 50% weight of one or more fillers.

7. The structure of claim 1, wherein the substrate encapsulated tape comprises a foam substrate and is encapsulated by a sealant comprising a polymer selected from the group consisting of butyl rubber, styrene block copolymer, EPDM rubber and combinations thereof.

8. The structure of claim 1, wherein the substrate-encapsulated tape comprises a foam substrate encapsulated by a sealant comprising a butyl rubber and no greater than 60% by weight filler.

9. The structure of claim 1, wherein the substrate-encapsulated tape passes the "U" channel penetration test method.

10. The structure of claim 1 wherein a., b., and c., make up greater than 60% by weight of the sealant used to seal the exterior of the structure.

11. The structure of claim 1 wherein a., b., and c., make up greater than 70% by weight of the sealant used to seal the exterior of the structure.

12. The structure of claim 1 wherein the exterior of the structure is free of sealants applied as a room temperature liquid.

13. The structure of claim 1 wherein the exterior of the structure is free of sealants applied as a room temperature liquid, and reactive sealants.

14. The structure of claim 1, wherein the structure is airtight as tested by the Sealtech test.

15. The structure of claim 1, wherein the single-sided thermoplastic film tape comprises:
   a backing having a first and second side, and
   a thermoplastic sealant applied in a film to one of the first and the second sides.

16. The structure of claim 1 wherein the single-sided thermoplastic film tape has a thickness of from 10 mil to 75 mil and a width of from 1 inch to 10 inches.

17. The structure of claim 1 wherein the single-sided thermoplastic film tape and the multi-sided thermoplastic tape pass the Penetration Seal Test.

18. The structure of claim 1 wherein the multi-sided thermoplastic tape is selected from the group consisting of double-sided thermoplastic film tape, butyl tape and combinations thereof.

19. The structure of claim 1, wherein the substrate-encapsulated tape passes the "U" channel penetration test method.

20. The structure of claim 1, wherein the structure is a recreational vehicle.

* * * * *